May 8, 1945.　　　A. W. WEITKAMP　　　2,375,336
VAPOR AND LIQUID CONTACTING APPARATUS
Filed March 17, 1943　　　2 Sheets-Sheet 1
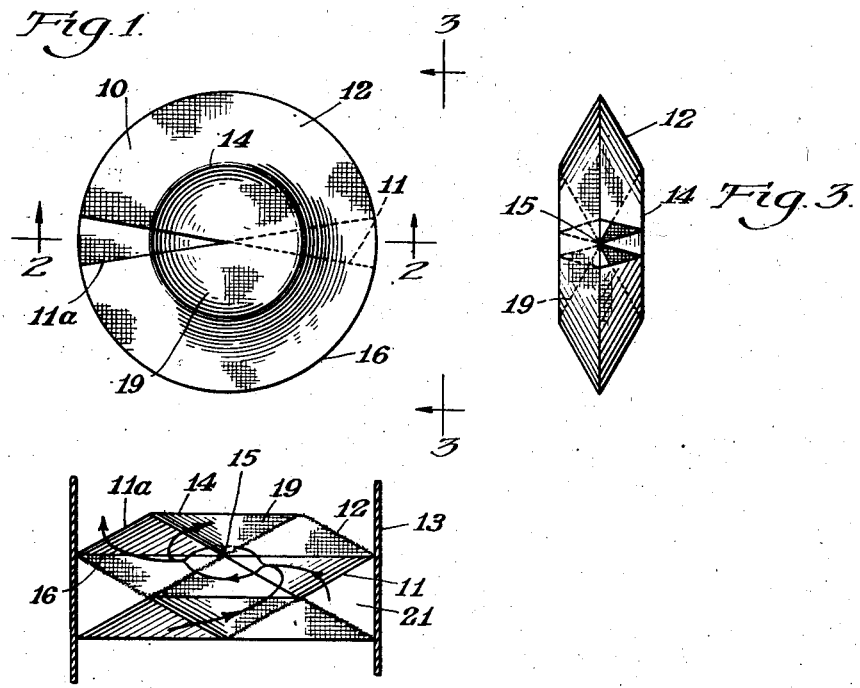
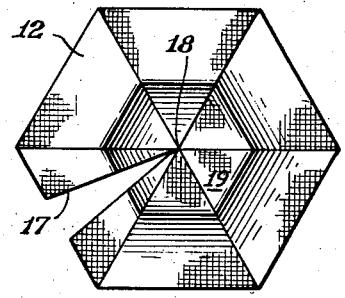
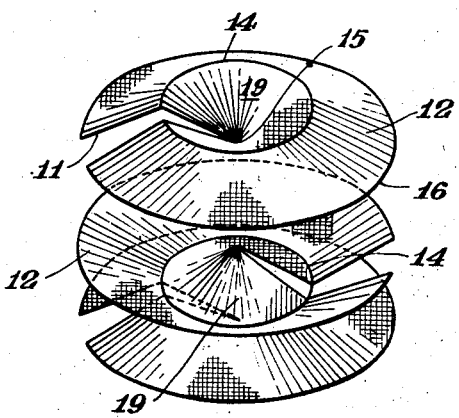
Inventor:
Alfred W. Weitkamp
By: Everett A. Johnson
Attorney.

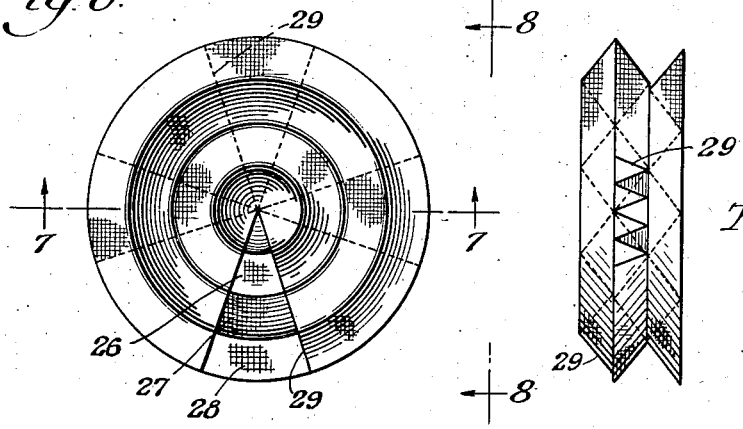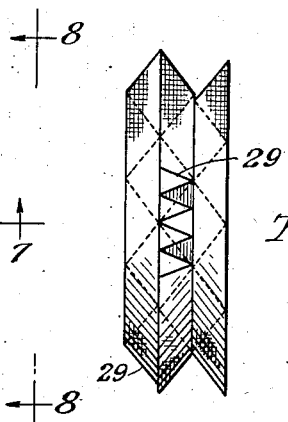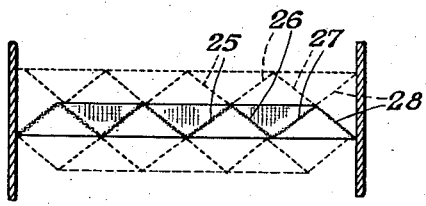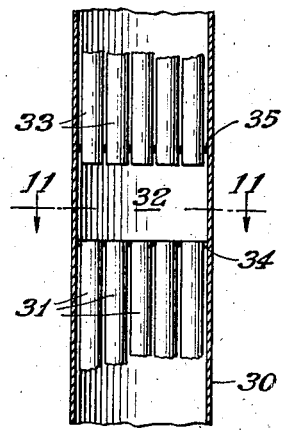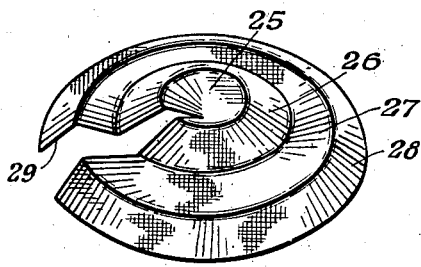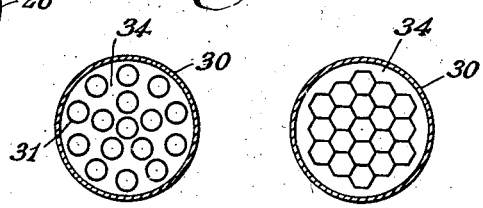

Patented May 8, 1945

2,375,336

UNITED STATES PATENT OFFICE 2,375,336

VAPOR AND LIQUID CONTACTING APPARATUS

Alfred W. Weitkamp, Whiting, Ind., assignor to Standard Oil Company, Chicago, Ill., a corporation of Indiana Application March 17, 1943, Serial No. 479,477

6 Claims. (Cl. 261—95)

My invention relates to vapor or gas and liquid contacting devices and more particularly is directed to apparatus, such as fractionating columns, scrubbing towers and the like wherein it is desirable to contact a film of liquid with the vapor or gas.

The invention contemplates a column packed with regularly disposed foraminous packing of capillary material, such as a wire gauze or fabric, perforated plate, and the like having capillary openings which are sealable with the liquid being treated. Larger vapor openings which are not sealable by the liquid are provided for the passage of vapors flowing upwardly within the column. The capillary material is of such configuration and is so arranged within the column that the liquid will have a repeatedly divided but continuous path downward and the vapor a continuous path upward, each phase without hindrance by the other. A self-supporting fabric such as woven wire gauze is a satisfactory material if the size of the wire and the size of the mesh are of such proportions that the openings are sealed by the liquid. In general, the physical characteristics of the capillary material are governed by the amount and characteristics of the liquid present within the zone.

More specifically my invention relates to an improved design for wire fabric packing for fractionating columns and an improved method for fabrication thereof. My improved design provides means for redistributing reflux liquid across the column and provides concentric vapor passageways within each unit.

It is an object of my invention to provide a packing wherein there is uniform distribution of both liquid and vapor throughout the available cross section of a column. Another object is to provide a packing which retains a minimum amount of liquid. A further object is to provide a column with optimum contact between liquid and vapor over an extended area. Another object is to provide a column of increased efficiency whereby the height equivalent to a theoretical plate is greatly reduced.

A further object is to provide a contacting device which is of simple and inexpensive construction. Another object is to provide a packing comprising a plurality of superposed capillary cells which adjust themselves in proper alignment within the column. It is a further object of my invention to provide a means for inducing the flow of liquids between and within the cells. Still another object is to provide a packing which effects redistribution of the liquid across the cross section of the column. Another object is to provide a packing which can be fabricated equally well in short and in long sections. An additional object is to provide a column of greatly increased efficiency. Another object is to provide packed columns, a plurality of which may be combined within a tower to effect series or parallel flow therethrough. Another object is to provide a column comprising a plurality of individual packed columns having a means for combining the vapors from a plurality of parallel columns and passing the combined vapors through another parallel group of columns. A further and more specific object is to provide apparatus wherein the flow of vapors is parallel and parallel in series. These and other objects will become apparent as the description of my invention proceeds.

The invention is directed primarily to the control of the flow of the descending liquids within the column or in other words, the redistribution across the column of the liquid being fractionated. In the prior art packing of the type wherein cones of foraminous material are disposed base to base and apex to apex within a column, the liquid passes from cone to cone by a single point of contact either at the apex junction or the base junction. The efficiency of such packing rapidly decreases as the size thereof is progressively increased to provide increased capacity. By my invention the descending liquids are caused to be redistributed across the column without excessive accumulation at any point since the liquid will be distributed from the multiplicity of circular contact points between the adjacent packing elements. The multiple concentric alternately oppositely pitched conical section pattern provides large areas of packing material within a short column and yet retains adequate pitch to provide the proper rate of drainage. In this way fractionating columns of greatly increased capacity result without sacrificing the efficiency of the precise fractionation.

My invention will be more readily understood from the following description and the accompanying drawings illustrating certain embodiments thereof wherein:

Figure 1 is a plan view of one embodiment of my concentric conical packing;

Figure 2 is a section taken along the line 2—2 of Figure 1 showing the relative position of a plurality of elements in place within a section of a column;

Figure 3 is an elevation taken along the line 3—3 of Figure 1;

Figure 4 is a schematic view in perspective showing the relative positions of a plurality of the elements;

Figure 5 is a plan view of another modification of the element comprising a hexagonal pyramidal design;

Figure 6 is a plan view of another embodiment of my invention comprising a plurality of concentric conical sections;

Figure 7 is a section taken along the line 7—7 of Figure 6;

Figure 8 is an elevation taken along the line 8—8 of Figure 6;

Figure 9 is a view in perspective of a single element illustrated in Figures 6, 7, and 8 comprising a plurality of concentric conical sections;

Figure 10 is a vertical section through a column comprising a plurality of packed units in parallel and series;

Figure 11 is a cross section taken along the line 11—11 of Figure 10; and

Figure 12 is similar to Figure 11 but illustrates the use of the packing element shown in Figure 5.

Referring to Figures 1 to 5 of the drawings, each contacting element 10 comprises concentric alternately oppositely pitched surfaces with a vapor opening 11 extending from the periphery of the disc to the center thereof. Each disc comprises concentric alternately oppositely pitched surfaces. The innermost surface comprises a cone and the remaining section comprises an oppositely pitched annulus. Thus the annular surface 12 is pitched toward the wall of the column 13 and the central conical surface 19 extends inwardly from contacting surface 14 and terminates in apex 15. In other words, the embodiment shown in Figure 4 comprises a cone in which the apex 15 has been depressed until the apex is in the plane of the base 16 of the cone.

The packing element according to my invention for liquid and vapor contacting apparatus also can be described as comprising a central cone portion 19 having an upturned flange 12 extending from the base 14 of the cone to a height substantially equal to the altitude of the cone and at substantially the same but oppositely directed pitch. Alternatively the element can be regarded as having the configuration of a surface of a frustum 12 of a cone and an inverted cone 19 extending from the top of the frustum 12 to the plane of the base 16 thereof.

Figure 5 illustrates another embodiment of my invention wherein the shape of the contacting element is modified from the circular to a hexagonal pyramidal design. The vapor opening 17 is illustrated as extending from one of the sides of the hexagonal base but the vapor opening may likewise extend along one of the shaped edges. This embodiment resembles a hexagonal pyramid in which the apex 18 has been turned back into the pyramid until it is in the plane of the base of the pyramid.

A plurality of the concentric conical section elements 10 is placed apex-to-apex and base-to-base as illustrated in Figures 2 and 4, the vapor openings 11 in alternate elements being about 180 degrees apart. By this means a plurality of annular vapor passageways 20 and contacting points 14, 15 and 16 are provided for redistributing the downwardly flowing liquid. The upwardly flowing vapor passes around the vapor space 21 between two elements 10 and enters the cell through the vapor opening 11. Within the cell 21 the stream of vapors is divided and passes around the annular passageway defined by annular surface 12 and conical surface 19 of each element. Thus the conical sections disposed apex-to-apex form a liquid baffle within the cell. The vapors recombine and pass from the capillary cell 21 by vapor opening 11a and the above sequence of vapor flow is repeated.

Figures 6, 7, 8 and 9 illustrate another form of my invention wherein a multiplicity of concentric conical sections are provided. By this means larger columns can be packed, for example, those having a diameter of about 4 inches or more.

This modification also can be described as comprising concentric alternately oppositely pitched surfaces. It comprises a central conical portion 25 and a plurality of concentric alternately oppositely pitched surfaces 26, 27 and 28 thus forming a plurality of peaks and valleys concentric with the central conical portion 25. In the illustrated embodiment a vapor opening 29 extends from the periphery of the disc to the apex of the central conical portion 25. In these larger sizes of packing additional vapor openings can be provided in the conical sections to compensate for the increasing length of the concentric vapor passageways. It is contemplated, therefore, that one or more vapor openings can extend from the periphery to the bed of the outermost valley cutting through surfaces 28 and 27 in spaced relationship and another vapor opening can extend from the bed of the valley to the apex of the central conical portion, cutting through surfaces 26 and 25. By this means the length of the vapor paths between vapor openings in the concentric conical sections can be about equal in length. Likewise, baffles can be provided in the outer annular passages. These can suitably be made, for example, by folding out the wire screen cut out to form the vapor opening. For this purpose the baffle can extend between surfaces 28 and be integral with one of them.

Each wall contacting edge fits the column at least as closely as the mesh of the gauze. If it were otherwise the liquid would short circuit the packing and would race down the walls of the column resulting in a loss of efficiency. Small differences in the diameter of the column are overcome by making the element slightly oversized. The spring of the disc holds it in place, compensates for any variations in the column and insures a very tight fit. No fastening of the individual elements to an adjacent element is necessary. A means, however, can be provided on the top and bottom of each pile or group of cells to maintain contact between the elements.

In operation, reflux or other liquid flows downwardly over the capillary material and seals the openings of the wire fabric. Large quantities of reflux liquid will be distributed without excessive accumulation at any point since the liquid will be distributed from the circles of contact between the adjacent elements having the configuration of my invention as well as from the apices of the conical center section. Thus the liquid will be continuously redistributed across the area of the column. The vapor will pass upwardly from cell to cell through the wedge-shaped vapor openings and distributing itself between the several annular vapor passageways in proportion to the area of the vapor opening in the wire fabric forming each passageway. The vapors then pass around and across the column to be recombined, mixed and redistributed in the next higher set of annular vapor passageways.

My design and fabrication results in an improved contact between ascending vapors and descending liquids with a substantial increase in efficiency over other packings of this class of similar diameter. Generally speaking, the conical wire gauze packing of the prior art decreases in efficiency as the diameter of the packed column increases. Thus a one inch prior art packing has an efficiency in terms of minimum height equivalent to the theoretical plate of about .56 inch. A similar packing having a diameter of about 2 inches has only about half the efficiency of the one inch column, its H. E. T. P. value being about .9 inch. However, efficiency tests run on my concentric conical wire gauze packing in a 2¼ inch column gave a H. E. T. P. value of about .53 inch. These efficiency tests were run in the customary manner using a benzene-ethylene dichloride mixture and operating the column at total reflux under as nearly adiabatic conditions as possible. Thus the large column according to my invention compares favorably with the prior art conical packing having less than one-half the diameter.

Figures 10, 11 and 12 illustrate a further embodiment of my invention wherein a plurality of columns provided with any of the packings described above are arranged within a larger column 30 in a manner which provides a parallel flow of vapors through a plurality of packed columns 31 at one level, a commingling within an intermediate zone 32 of the ascending vapors from each of the plurality of contacting units 31 arranged in parallel, and a subsequent fractionation of said commingled vapors in a second group of contacting columns 33 arranged in parallel with respect to each other and in series with respect to the first group of packed columns 31. The liquid likewise flows downwardly through a parallel group of packed units 33, the liquid from each of the parallel packed units 33 is commingled within zone 32 and redistributed to each of several additional packed units 31 arranged in parallel with respect to each other and in series with respect to the upper group. The packed columns are held within the larger column 30 by any suitable sealing and retaining means 34 and 35. It is contemplated that a heat exchange medium can be supplied around the group of packed columns. A suitable heat exchange medium can be a portion of the reflux liquid withdrawn from a selected commingling zone. Likewise vapors withdrawn from a commingling zone can be condensed by heat exchange with the liquid to be fractionated in an adjacent zone. Figure 11 illustrates a column of this type wherein the contacting elements within the individual columns are similar to those shown in Figures 1 or 6. Figure 12 illustrates a similar embodiment using the hexagonal embodiment shown in Figure 5.

It is also contemplated that a plurality of elements can be formed in a single sheet. These sheets can be arranged in pairs, base to base. Alternate pairs of sheets can be rotated 180 degrees, for example, to bring the vapor openings of superimposed pairs of sheets in their optimum relationship. Likewise, a plurality of preformed elements can be arranged in superposed pairs on a suitable supporting means thereby placing a plurality of cells across the vapor path as illustrated in Figure 12.

Although I have described my invention with reference to certain embodiments, it is contemplated that various changes can be made in the details thereof within the scope of my invention without departing from the spirit thereof. It is therefore understood that my invention is not to be limited to the specific details shown and described.

I claim:

1. A packing for a liquid and vapor contacting apparatus arranged to provide a plurality of cells disposed in superposed relationship, each cell being composed of two similar elements of capillary material disposed base to base, each element comprising a plurality of concentric, alternately oppositely pitched surfaces, each element being provided with a wedge shaped vapor opening larger than the capillary openings and extending radially through the said alternately oppositely pitched surfaces, said elements being arranged with respect to each other so that the length of the vapor paths between said vapor openings are substantially equal.

2. A packing for liquid and vapor contacting apparatus comprising capillary material, the capillary openings of which seal with the liquid under treatment, the said capillary material being arranged to provide a plurality of concentric cells disposed in superposed relationship, each of said concentric cells comprising two elements of capillary material of a depressed conical configuration where the normal apex of the cone is in the plane of the base of said cone, each cell having vapor openings larger than the capillary openings to permit passage of vapors between successive flights of concentric cells.

3. Apparatus for liquid and vapor contacting comprising a plurality of packing elements supported in superposed relationship within a column to provide a plurality of cells, each of said elements comprising a unitary member constructed of wire fabric and being characterized by having concentric alternately oppositely pitched surfaces and by each element having a vapor opening to permit passage of vapors between the superposed cells.

4. Apparatus for liquid and vapor contacting comprising a plurality of packing elements supported in superposed relationship within a confining means to provide a plurality of cells, each of said packing elements comprising a unitary wire fabric element having a central conical portion and a plurality of peaks and valleys concentric therewith and a vapor opening to permit passage of vapors between said cells.

5. Apparatus for liquid and vapor contacting comprising a plurality of packing elements arranged within a column in superposed relationship to provide a plurality of cells, said elements comprising a wire fabric cone having an annular upturned flange integral with said cone and extending from the base of the cone to a height equal to the altitude of the cone and a radially extending vapor opening to permit passage of vapors through said element.

6. Apparatus for liquid and vapor contacting comprising a plurality of packing elements supported within a column in superposed relationship to provide a plurality of interconnected cells, each of said elements comprising a plurality of wire fabric disks having a central conical portion and concentric alternately oppositely pitched surfaces, the openings of said fabric being sealable with the liquid under treatment, each of said disks having a vapor opening larger than the capillary openings to permit passage of vapors between successive flights of concentric cells, said vapor opening extending radially from the central conical portion and across the concentric alternately oppositely pitched surfaces.

ALFRED W. WEITKAMP.